US009014976B2

(12) United States Patent  (10) Patent No.: US 9,014,976 B2
Ushida  (45) Date of Patent: Apr. 21, 2015

(54) NAVIGATION DEVICE

(75) Inventor: Koichi Ushida, Anjo (JP)

(73) Assignee: Aisin AW Co., Ltd., Aichi-Ken (JP)

( * ) Notice: Subject to any disclaimer, the term of this patent is extended or adjusted under 35 U.S.C. 154(b) by 792 days.

(21) Appl. No.: 12/726,159

(22) Filed: Mar. 17, 2010

(65) Prior Publication Data

US 2010/0250112 A1    Sep. 30, 2010

(30) Foreign Application Priority Data

Mar. 30, 2009  (JP) ................................. 2009-082594
Jan. 21, 2010   (JP) ................................. 2010-011090

(51) Int. Cl.
  *G01C 21/00*  (2006.01)
  *G01C 21/36*  (2006.01)
  *G01C 21/34*  (2006.01)

(52) U.S. Cl.
  CPC .......... *G01C 21/367* (2013.01); *G01C 21/3682* (2013.01); *G01C 21/34* (2013.01); *G01C 21/3614* (2013.01)

(58) Field of Classification Search
  CPC .. G01C 21/34; G01C 21/3667; G01C 21/367; G01C 21/3682; G08G 1/096866; G08G 1/0969
  USPC ......... 701/400, 409–411, 418, 428, 431, 432, 701/532, 533; 340/995.1, 995.14, 995.17, 340/995.19, 995.24, 995.27
  See application file for complete search history.

(56) References Cited

U.S. PATENT DOCUMENTS 5,612,881 A  * 3/1997 Moroto et al. ................. 701/428
6,040,824 A  * 3/2000 Maekawa et al. ............. 345/173
6,434,482 B1 * 8/2002 Oshida et al. ................. 701/426
6,571,169 B2 * 5/2003 Miyaki ......................... 701/400
6,950,743 B2 * 9/2005 Kainuma et al. ............. 701/532
6,952,644 B2 * 10/2005 Nakagawa .................... 701/438

(Continued)

FOREIGN PATENT DOCUMENTS

| CN | 101042300 A | 9/2007 |
| EP | 1359392 A1 | 11/2003 |
| JP | 09-081628 A | 3/1997 |
| JP | 2001-165674 B2 | 6/2001 |

(Continued)

OTHER PUBLICATIONS

European Search Report issued by the EPO on Oct. 18, 2012, in corresponding application EP 10002319.1-1236/2236986.

(Continued)

*Primary Examiner* — Jack W Keith
*Assistant Examiner* — Chuong P Nguyen
(74) *Attorney, Agent, or Firm* — Lowe Hauptman & Ham, LLP (57) ABSTRACT

If a destination set on a display 3 is a facility not having connection relation between facilities stored in a facility information DB 84, a scroll direction detecting unit 92 that detects a scroll direction of a map 31 detects a direction instructed for scroll as the scroll direction and a display controlling unit 94 performs scroll of the map 31 in the scroll direction. In addition, if the set destination is a facility having the connection relation between the facilities, the scroll direction detecting unit 92 that detects a scroll direction of the map 31 detects the scroll direction based on the connection relation of the destination and the direction instructed for scroll and the display controlling unit 94 performs the scroll of the map 31 to a position of a facility connected to the destination in the scroll direction.

2 Claims, 6 Drawing Sheets

(56) References Cited

U.S. PATENT DOCUMENTS

| | | |
|---|---|---|
| 7,042,370 B2 | 5/2006 | Morie |
| 7,239,964 B2 * | 7/2007 | Takizawa ................ 701/455 |
| 7,969,412 B2 * | 6/2011 | Nagiyama et al. ............ 345/156 |
| 2004/0064250 A1 | 4/2004 | Hirano et al. |
| 2004/0201501 A1 * | 10/2004 | Daizen ................ 340/995.16 |
| 2005/0137788 A1 * | 6/2005 | Kimura ................ 701/201 |
| 2006/0052935 A1 * | 3/2006 | Nakayama et al. ............ 701/211 |
| 2007/0078599 A1 * | 4/2007 | Yoshioka et al. ............ 701/211 |
| 2008/0306683 A1 | 12/2008 | Ando et al. |
| 2009/0150069 A1 * | 6/2009 | Iao ................ 701/207 |

FOREIGN PATENT DOCUMENTS

| | | | | |
|---|---|---|---|---|
| JP | 2002325850 | * | 11/2002 | ............ G01C 21/00 |
| JP | 2004-212255 B2 | | 7/2004 | |
| JP | 2006214980 A | * | 8/2006 | ............ G01C 21/00 |
| JP | 2007071587 A | * | 3/2007 | ............ G01C 21/00 |
| JP | 2008256444 A | * | 10/2008 | ............ G01C 21/00 |

OTHER PUBLICATIONS

Search Report dated Nov. 21, 2013, corresponds to Chinese patent application No. 201010134542X.

* cited by examiner

NAVIGATION DEVICE

INCORPORATION BY REFERENCE

The disclosure of Japanese Patent Application No. 2009-082594 filed on Mar. 30, 2009 and No. 2010-011090 filed on Jan. 21, 2010, including the specification, drawings and abstract thereof, is incorporated herein by reference in its entirety.

BACKGROUND OF THE INVENTION

1. Field of the Invention

The present invention relates to a navigation device, in which, after a destination was inputted, the destination can be easily changed.

2. Description of the Related Art

In navigation devices, a host position is acquired in real time using a GPS (Global Positioning System) satellite. The navigation devices of this kind are common for vehicles such as automobiles and for portable devices that pedestrians carry.

In such navigation devices, a map is displayed on a monitor based on computerized map data and the host position is indicated on the map. Further, such navigation devices include a function that provides route guidance based on a route that was set by a user specifying a departure point, a destination, and the like.

As the navigation devices of this kind, the technologies of Japanese Patent Application; Publication No. JP-A-2004-212255 and Japanese Patent Application; Publication No. JP-A-2001-165674 are publicly-known.

Japanese Patent Application; Publication No. JP-A-2004-212255 discloses a navigation device, in which, when a user has instructed a scroll direction, a map is scrolled along a road where a vehicle is located, and stopped at a predetermined position (for example, an intersection with a main road, an entrance/exit/junction of a highway, or the like).

In addition, Japanese Patent Application; Publication No. JP-A-2001-165674 discloses a navigation device, in which, when a guidance route is being searched under predetermined conditions, a vehicle position is moved along the searched guidance route.

SUMMARY OF THE INVENTION

According to the technology of Japanese Patent Application; Publication No. JP-A-2004-212255, it becomes possible only by a simple operation to sequentially confirm intersections in the vicinity and the like using a vehicle position as a reference. In addition, it becomes unnecessary to keep contemplating a screen after giving a direction instruction because a scroll automatically stops at an intersection or the like that the user desires to confirm.

In addition, according to the technology of Japanese Patent Application; Publication No. JP-A-2001-165674, by moving the vehicle position along the guidance route, the map in the vicinity of the guidance route can be displayed. Therefore, it becomes unnecessary to scroll the displayed map manually and becomes possible to reduce complicated operations for confirming the guidance route and the map information in the vicinity.

With the technologies disclosed by Japanese Patent Application; Publication No. JP-A-2004-212255 and Japanese Patent Application; Publication No. JP-A-2001-165674, road information along a travel of a vehicle is provided without complicated operations; however, information of roads other than a currently-traveling road cannot be targeted.

For example, after setting a destination on the map, if the vehicle is not traveling, or if the guidance route is not set, the destination cannot be easily changed to a facility associated with the destination.

It is an object of the present invention to provide a navigation device, in which complicated operations for changing the destination is eliminated and the destination is easily reset.

MEANS FOR SOLVING THE PROBLEMS

According to a first aspect of the present invention, the navigation device includes: a facility information recording unit that records facilities and connection relation between the facilities; a destination setting unit that sets a destination from the facilities recorded in the facility information recording unit; a displaying unit that displays a map of a vicinity of the set destination; an operating unit that is used for a scroll operation of the map; a scroll direction detecting unit that detects a scroll direction of the map based on a direction operated on the operating unit; and a display controlling unit that scrolls the map in the detected scroll direction, wherein, if the destination is a facility not having the connection relation, the scroll direction detecting unit detects the direction operated on the operating unit as the scroll direction and the display controlling unit performs scroll of the map in the scroll direction, and if the destination is a facility having the connection relation, the scroll direction detecting unit detects the scroll direction based on the connection relation of the destination and the direction operated on the operating unit and the display controlling unit performs scroll of the map to a position of a facility connected to the destination in the scroll direction.

Here, the facility information recording unit that records the facilities and the connection relation between the facilities can records stations of railroads, interchanges of highways, bus stops of buses on routine runs, and the like, as the facilities. The connection relation means, for example, a railroad track in case that the facility is a station of a railroad, a highway in case that the facility is an interchange of the highway, and a bus route in case that the facility is a bus stop of a bus on a routine line.

In addition, the destination setting unit that sets the destination from the facilities recorded in the aforementioned facility information recording unit is only necessary to be an input unit capable of specifying the facilities, and may be applied to a method of searching from a facility list, a direct input on a keyboard or an audio input using a voice recognition.

The aforementioned displaying unit that displays the map of the vicinity of the set destination can be a display, a touch switch provided with a display function, or the like.

The aforementioned operating unit that is used for the scroll operation of the map can apply a scroll input of a finger operation by a drag operation or a flick operation on the touch panel, and a scroll input with a keyboard, a mouse, a remote control device for a remote operation, a joy stick, a stylus pen, and the like.

The aforementioned scroll direction detecting unit that detects the scroll direction of the map, performs detection of the direction based on for example the finger operation by the drag operation or the flick operation on the touch panel.

The aforementioned display controlling unit that scrolls the map in the detected scroll direction, determines a position to display on the map based on scrolling in accordance with a scroll direction, a speed, a distance, and the like.

In addition, if the destination is a facility not having the connection relation, the scroll direction detecting unit detects a direction instructed for scroll as the scroll direction and the display controlling unit performs the scroll of the map in the scroll direction. If the destination is a facility having the connection relation, the scroll direction detecting unit detects the scroll direction based on the connection relation of the destination and the direction instructed for scroll and the display controlling unit performs the scroll of the map to a position of a facility connected to the destination in the scroll direction.

According to a second aspect of the present invention, in the navigation device, the displaying unit functions as the operating unit, and the scroll direction detecting unit, if the facility set as the destination is a facility having the connection relation and a start point of a scroll instruction on the operating unit is on the facility displayed by the displaying unit, detects the scroll direction based on the connection relation of the facility and the direction operated on the operating unit.

According to a third aspect of the present invention, in the navigation device, the display controlling unit displays the facility connected to the destination so as to be distinguishable as a destination change candidate.

Here, for a distinguishable display, a relation with the facility as the destination can be displayed with shading of a color, a mark, or the like.

According to a fourth aspect of the present invention, in the navigation device, the facility having the connection relation is a station connected through a railroad track or an interchange connected through a highway or both Here, the facility having the connection relation is the station connected through the railroad and/or the interchange of the highway. The connection relation is physical connection relation, which matches image of an operator and can be easily recognized by the operator.

According to a fifth aspect of the present invention, in the navigation device, the display controlling unit, if a speed of a scroll instruction given on the operating unit is equal to or more than a predetermined speed, performs the scroll to the station where a limited express train or a express train stops according to the speed.

Here, if the speed of the scroll instruction given on the operating unit is less than the predetermined speed, the display controlling unit performs the scroll to the station where a local train stops, and if the speed of the scroll instruction is equal to or more than the predetermined speed, the display controlling unit performs the scroll to the station where the limited express train or the like stops. Or, the predetermined speed may be further divided to a plurality of steps, such that the station where the limited express train stops or the station where the express train stops can be selected. Practically, a scroll display in two steps may be convenient because a next station connected through the railroad track is selected.

EFFECTS OF THE INVENTION

According to the first aspect of the present invention, in the navigation device that searches for a route to a destination or provides guidance on information of the destination, if the destination is a facility not having connection relation with other facilities, a scroll direction detecting unit that detects a scroll direction of a map detects a direction operated on an operating unit as the scroll direction and a display controlling unit performs scroll of the map in the scroll direction. If the destination is a facility having the connection relation with other facilities, the scroll direction detecting unit that detects the scroll direction of the map detects the scroll direction based on the connection relation of the destination and the direction operated on the operating unit and the display controlling unit performs scroll of the map to a position of a facility connected to the destination in the scroll direction.

Consequently, after setting the destination, if it becomes necessary to select a place other than such destination, an associated place that belongs to an attribute of the originally-set destination is searched only by a scroll instruction from the originally-set destination, by which a troublesome operation of re-inputting the destination for a setting change is eliminated and re-setting becomes easy. Even after the change was performed, the operator can perform another change without feeling bothered. In addition, a very short time is required for the operation of the operator by a finger or a pen, thereby the time for destination change can be reduced.

According to the second aspect of the present invention, a displaying unit in the navigation device is a touch panel. If the facility set as the destination is a facility having the connection relation and a start point of the scroll instruction on the touch panel is on the facility displayed on the touch panel, the scroll direction is detected based on the connection relation of the facility and the direction instructed for scroll. Therefore, in addition to the effects of the first aspect, the operator can visually confirm the facility on the map and instruct the scroll through the finger operation by a drag operation or a touch operation on the touch panel, which makes the device easy to operate for anyone.

According to the third aspect of the present invention, in the navigation device, the display controlling unit displays the facility connected to the destination so as to be distinguishable as a destination change candidate. Therefore, in addition to the effects of the first or the second aspect, it is possible to confirm the direction to scroll, which can prevent the operator from scrolling in a wrong direction.

According to the fourth aspect of the present invention, in the navigation device, the facility having the connection relation is a station connected through a railroad track or an interchange of a highway or both. Therefore, in addition to the effects of any one of the first to third aspects, a selection can be performed as if operating on the map, and such operation method ergonomically matches the feeling of the human-being, and is easily learned with less mistakes.

According to the fifth aspect of the present invention, in the navigation device, the display controlling unit, if a speed of the scroll instruction is equal to or more than a predetermined speed, performs the scroll to the station where a limited express train stops. Therefore, in addition to the effects of any one of the first to fourth aspects, it is possible to add the information of the scroll speed, which enables the operator to select a desired station.

DETAILED DESCRIPTION OF THE PREFERRED EMBODIMENT

An embodiment of the present invention is described in conjunction with the accompanying drawings. In the embodiment, the same symbols and signs in the drawings refer to the same or corresponding function parts; therefore, overlapped explanation is omitted.

Figure 1:
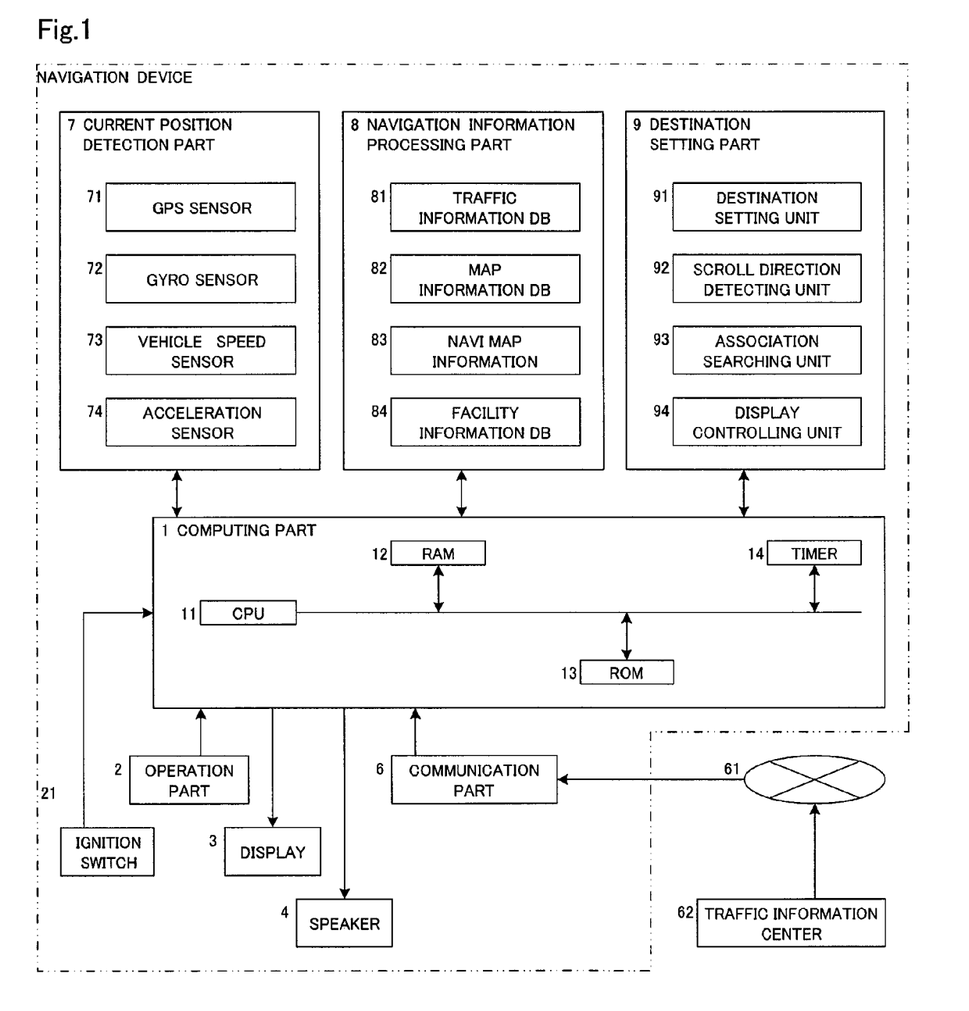
FIG. 1 is a block diagram showing an overall structure including a part of functional expressions in a navigation device according to an embodiment of the present invention.

The navigation device according to a block diagram shown in FIG. 1 includes: a computing part 1 configured with a microprocessor that performs various kinds of computing processing based on input information; an operation part 2 that receives an input operation such as a key input, an audio input, or the like by a user; a display 3 configured with a liquid crystal or the like that displays to the user information of an operation menu, a map, and the like; a speaker 4 that performs audio guidance regarding route information, traffic information, and the like; a communication part 6 that performs communication with a traffic information center 62 such as a VICS (a registered trademark: Vehicle Information and Communication System), a RDS-TMC (Radio Data System-Traffic Message Channel), and the like via a network 61; a current position detection part 7 configured with various kinds of sensors that detect a current position and a direction of a vehicle and the like; a navigation information processing part 8 configured with a storage medium such as a hard disk or the like that stores various kinds of data and is capable of writing and reading; a destination setting part 9 that performs setting of a destination for executing navigation functions such as route search, and the like. In addition, the display 3 according to the present embodiment also serves as a touch switch as the operation part 2.

The computing part 1 configured with the microprocessor includes: a CPU 11 that performs computing and control of the navigation device; a RAM 12 that is utilized as a working memory when the CPU 11 performs various computing processing; a ROM 13 that stores a control program and the like, a timer 14, and the like. As the RAM 12 and the ROM 13, a semiconductor memory, a magnetic core, and the like are utilized. As the CPU 11 that performs computing and control, a unit having a computing function such as a MPU can be utilized.

The ROM 13 stores various programs, and the RAM 12 stores various data. If the ROM 13 is an EEPROM, the programs, data, and the like can be read from external devices and written in the ROM 13. Further, the programs, the data, and the like can be updated by changing a memory card and the like.

The current position detection part 7 that detects the current position of the vehicle, is configured with a GPS sensor 71, a gyro sensor 72 as a direction detection part, a vehicle speed sensor 73 that detects a travel speed and a travel distance of the vehicle, an acceleration sensor 74 that detects inclination of the vehicle, and the like.

The navigation device according to the present embodiment is capable of receiving, at intervals of a predetermined time, road traffic information such as traffic regulation information, and information relating to congestion of a road and the like from the traffic information center 62 via the network 61.

As the network 61, a communication system such as communication networks, for example, a wireless LAN (Local Area Network), a WAN (Wide Area Network), an intranet, a telephone network, and the like can be utilized. In addition, a communication system using CS broadcasting by a communication satelite, BS broadcasting, digital terrestrial broadcasting, FM multiplex broadcasting, and the like can be utilized. Further, a communication system such as an electronic toll collection system (ETC) and a dedicated short range communication system (DSRC) utilized in an intelligent transportation system (ITS), and the like also can be utilized.

Further, the respective components are explained in detail with reference to FIG. 1.

The computing part 1 is electrically connected to the respective peripheral devices of the operation part 2, the display 3, the speaker 4, and the communication part 6. The operation part 2 is operated when inputting a destination as a guidance end point, or when performing search for information relating to a facility, and configured with a plurality of operation switches such as various keys. The computing part 1 performs control to execute various operations according to a switch signal outputted by the operation on each switch of the operation part 2. An ignition switch 21 performs start and stop of an engine.

As the operation part 2, a keyboard, a mouse, a remote control device for remote operation, a joystick, a stylus pen, and the like can be also utilized. In addition, the operation part 2 can be configured with a touch panel installed in front of the display 3.

On the display 3, an operation menu, a searched route to the destination, guidance information along the searched route, an after-mentioned destination change guidance information, traffic information, news, weather forecast, time, E-mail, TV programs, and the like are displayed.

In place of the display 3, a CRT display, a plasma display, EL, or the like can be utilized. Or, a hologram device that projects hologram on a front glass of the vehicle can be utilized.

The speaker 4 outputs audio guidance for traveling along the searched route and for a destination change based on an instruction from the computing part 1. The audio guidance to be provided here includes for example "The destination is changed.", "A candidate place for changing a destination is displayed. Do you select it?", "XX station was selected as a destination.", and the like.

As the audio outputted by the speaker 4, various types of sound effect and various guidance information previously-recorded in an IC memory or the like can be outputted in addition to a synthesized sound.

The communication part 6 is configured with a beacon receiver, a network device, a FM receiver, and the like.

The beacon receiver receives, from a radio wave beacon device, an optical beacon device, and the like, which are installed along a road, the road traffic information including various information such as congestion information, the traffic regulation information, parking lot information, traffic accident information, congestion status of service areas, which were sent from the traffic information center 62 or the like.

The network device realizes communication on the communication system such as communication networks, for example, the LAN, the WAN, the intranet, a cellular phone network, a telephone network, a public communication network, a private communication network, an Internet, and the like.

The FM receiver receives, in addition to the information from the traffic information center 62, FM multiplex information including information of news, weather forecast, and the like as the FM multiplex broadcasting via a FM broadcasting station.

The current position detection part 7 is configured with various sensors for detecting the current position and the direction of the vehicle, and the like. The GPS sensor 71 receives radio waves generated by an artificial satellite to detect the current position of the vehicle on the earth and a current time.

The gyro sensor 72 detects a turn angle of the vehicle. Here, as the gyro sensor 72, a gas rate gyro, a vibration gyro, or the like is utilized for example. In addition, by integrating the turn angle detected by the gyro sensor 72, the direction of the vehicle can be detected. The vehicle speed sensor 73 detects a vehicle speed by measuring a rotation speed of wheels of the vehicle, for example. In addition, the vehicle speed sensor 73 can detect a distance based on the measured rotation speed. The acceleration sensor 74 detects the inclination of the vehicle to improve a detection accuracy of a vehicle position on a road having a large difference in height.

The navigation information processing part 8 is configured with a storage medium that stores various kinds of data and is capable of writing and reading. In the present embodiment, a hard disk is utilized as the storage medium of the navigation information processing part 8. However, besides a magnetic disk such as the hard disk, the memory card, a magnetic tape, a magnetic drum, a CD, a MD, a DVD, an optical disk, an IC card, and the like can be utilized as a part of an external storage device.

A traffic information database (hereinafter, referred to as "DB") 81 of the navigation information processing part 8 stores the traffic regulation information relating to traffic regulation due to a road construction, and the like, the congestion information, and the like, which were received from the traffic information center 62. The respective road traffic information received from the traffic information center 62 includes information of a type, a position, a distance of a congested section, a congestion level, and the like. A map information DB 82 stores navi map information that is utilized for travel guidance and route search of the navigation device according to the present embodiment. The navi map information 83 here includes various kinds of information necessary for route guidance and map display. For example, the navi map information 83 includes road data for searching for a route to a facility that was set as the destination, map display data for displaying the searched route and the map on the display 3, and the like.

A facility information DB 84 stores facility information relating to a POI (Point of Interest) such as a station, a store, and the like. In the present embodiment, the facility information includes an interchange of a highway, a bus stop, and the like. In addition, the facility information includes a facility name and a position of a facility. Further, for the facility that is connected to an adjacent facility through a line such as a station and an interchange, connection information of each facility is recorded. For example, in case of the station, position information of an adjacent station connected through the railroad track, direction information of the railroad track, and the like are recorded. Contents of the map information DB 82 and the facility information DB 84 are updated by downloading update information delivered through the communication part 6 from a map information delivery center.

The destination setting part 9 is a signal processing part that not only can set a destination, where the user desires to go, or of which information the user desires to acquire, but also can change the destination. For example, after setting a name of a station as the destination, if changing the station as the destination, a candidate station as a new destination is presented based on the connection relation of the railroad track where the station as the destination exists. In the same manner, after inputting an interchange of a highway as the destination, if changing the destination interchange, a candidate interchange as a new destination is presented based on the connection relation of a highway line where the destination interchange exists. The connection relation here is physical connection relation of the railroad track, the highway, and the like stored in the facility information DB 84.

Next, the destination setting part 9 is described in detail below.

In the present embodiment, the destination setting part 9 includes a destination setting unit 91. The destination setting unit 91 is a destination setting function of the navigation device that searches for a route from the current position to the destination and provides route guidance according to the searched route. The destination is not limited to a point as where-to-go for searching for a route, but may be a target point for acquisition in case of acquiring information of a facility. The destination may be set by performing search with a facility name, an address, a memory point, a telephone number, or the like and selecting a retrieved facility, or by searching for a point on the map.

A scroll direction detecting unit 92 detects a direction to scroll when the user has performed a scroll operation. Specifically, if the operation part 2 is a key, the map is scrolled in the direction in which the direction key has been pressed. If the operation part 2 is the joy stick, the map is scrolled in the direction in which the joy stick has been pushed. If the operation part 2 is a touch panel, the map is scrolled toward a touched point (a pressed point). For example, if the user has touched an upper-center part of the touch panel, the map is scrolled in an upper direction, and if the user has touched an upper-right part of the touch panel, the map is scrolled in an upper-right direction. Further, if the touch panel is capable of detecting a movement of a touch position, scroll by drag operation or flick operation on the touch panel is possible. In case of the drag operation on the touch panel, the map is scrolled following the movement of a touching finger of the user. In case of the flick operation, the map is scrolled in a movement direction of when the finger of the user left the touch panel.

An association searching unit 93 estimates a candidate for the destination that the user desires to change based on information of the facility that the user has set as the destination and the scroll direction in which the user has operated.

For example, if the destination is a station of a railroad, when the scroll operation is performed in the direction of the railroad track connected to the station as the destination, a station on the same railroad track that exists in the scroll direction is selected as a destination change candidate. In the same manner, if the destination is an interchange, when the scroll operation has been performed in the direction of the highway where the interchange exists, an adjacent interchange on the same highway is selected according to the scroll direction as the destination change candidate.

That is, the association searching unit 93 estimates the candidate for the destination that the user desires to change based on the connection relation identified from the facility that has been set as the destination, and the direction of the scroll operation.

A display controlling unit 94 performs scroll of a map 31 (refer to FIG. 9) to the estimated destination change candidate and displays the destination change candidate on the map 31 with a specific icon 33 (refer to FIG. 9) to notify the user of the destination change candidate. When the user selects the icon, the destination setting unit 91 sets the candidate as a new destination.

In the present embodiment, a displaying unit that displays the map 31 of the vicinity of the set destination is the display 3. An operating unit that is used for the scroll operation of the map 31 applies a scroll input of a finger operation by a drag operation and a flick operation on the touch panel.

Next, the control of the navigation device according to the present embodiment that is performed by the computing part 1 is described in conjunction with a screen display of the display 3.

Figure 2:
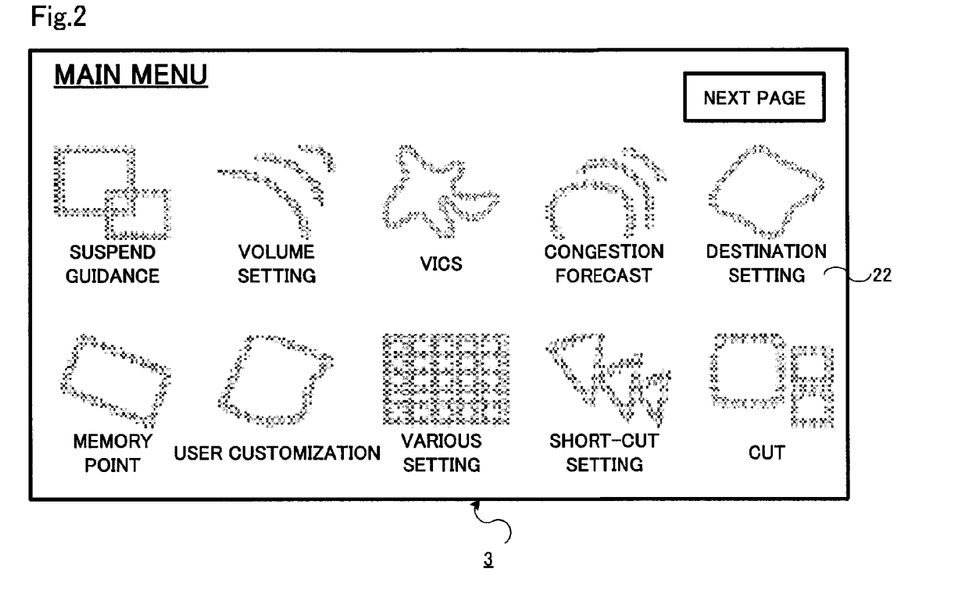
FIG. 2 is an explanatory drawing of a main menu screen in the navigation device according to the embodiment of the present invention.
Figure 3:
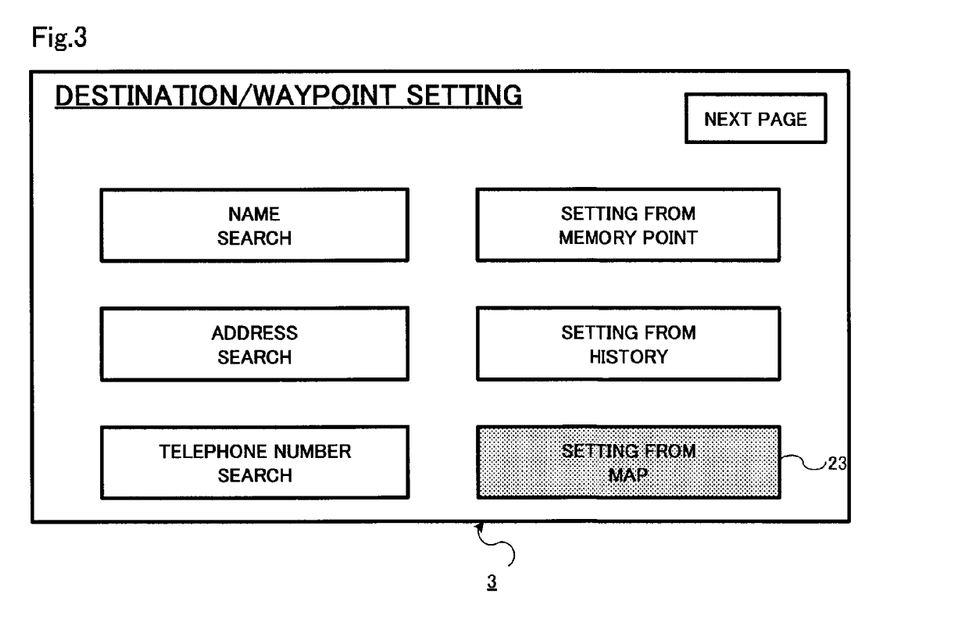
FIG. 3 is an explanatory drawing of a destination/waypoint setting screen in the navigation device according to the embodiment of the present invention.

FIG. 2 shows a main menu screen on the display 3 displayed by an execution of a main program (not shown). By selecting destination setting 22 in the main menu screen, a destination/waypoint setting screen shown in FIG. 3 is displayed. When a destination is selected in any of various kinds of search methods, a program of a "destination setting routine" is executed. In the following description, only a change of the destination is described; however, a change of s waypoint can be performed in the same manner.

Here, the scroll operation on the screen of the display 3 is described with reference to FIGS. 4 to 6.

Figure 4:
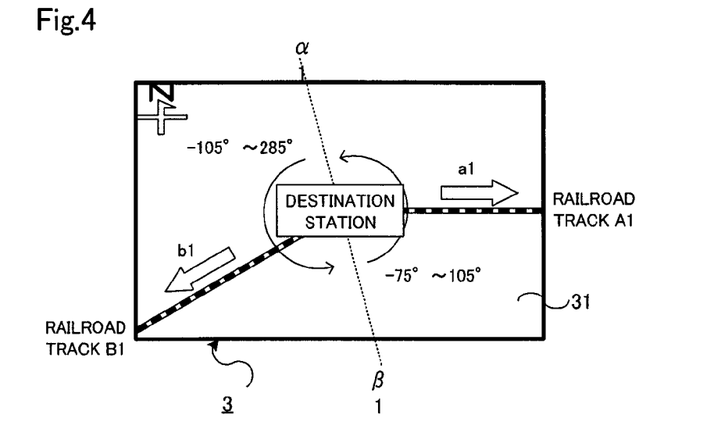
FIG. 4 is an explanatory drawing of detecting a flick scroll operation in an example of a station in a single railroad track in the navigation device according to the embodiment of the present invention.

FIG. 4 is an example of a case where a station of a railroad has been set as the destination.

Here, the scroll direction is determined using information of the direction of the flick operation. The flick operation is performed by the user designating a specific point on the touch panel provided in front of the display 3 and sliding in an arbitrary direction. When the user touches the display 3 and performs a flick in a direction of an arrow a1 along the railroad track, the map 31 is scrolled in an east direction (a right side). Then, the adjacent station in the east direction of the station as the destination is displayed as the candidate and becomes selectable as an alternative destination. In the same manner, when the user performs a flick in a direction of an arrow b1 along the railroad track, the map is scrolled in a southwest direction (a lower-left side). Then, the adjacent station in the southwest of the station as the destination is displayed as the candidate and becomes selectable as an alternative destination.

Here, whether or not the flick was performed along the railroad track is determined by whether or not the flick was performed from the station as the facility that is the destination (a destination station) as a center at an angle within a predetermined area along each of a railroad track A1 (a railroad track extending from the destination station to the east) and a railroad track B1 (a railroad track extending from the destination station to the southwest). For example, centered on the destination station, a straight line α1 (105 degrees) and a straight line β1 (285 degrees) that equally divide angles made by the railroad track A1 (0 degrees) and the railroad track B1 (210 degrees) are set. Then, if a flick angle, that is, an angle of a line made with a start point and an end point of the flick is from 285 to 105 degrees including 0 degrees that is on the side of the railroad track A1, it is determined that the flick was performed along the railroad track A1; and if the flick angle is from 105 to 285 degrees that is on the side of the railroad track B1, it is determined that the flick was performed along the railroad track B1

When a facility that is connected through a line or a highway such as a station, an interchange, or the like has been set as the destination, the map is scrolled by the scroll operation of the user to an adjacent facility that exists in the operated direction. In the aforementioned embodiment, the scroll to the adjacent station is performed on condition that the station is set as the destination. However, the scroll to the adjacent station may be performed on condition that the station is set as the destination and the start point of the flick is the destination station. In this case, it is possible to differentiate the usage as performing the flick using the destination station as the start point if the scroll to the adjacent station is required and performing the flick using another point as the start point if usual map scroll is required.

The straight line α1 (105 degrees) and the straight line β1 (285 degrees) that are borders for the railroad track A1 (0 degrees) and the railroad track B1 (210 degrees) using the destination station as the center equally divide angles made by the railroad track A1 and the railroad track B1, and indicates the areas for the railroad track A1 and the railroad track B1 to the user. Consequently, the areas for the railroad track A1 and the railroad track B1 are normally acquired by equally dividing the angles made by the railroad track A1 and the railroad track B1 using the destination station as the center although the exactitude is not required. If the railroad track A1 or the railroad track B1 is curved, the strait line α1 and the straight line β1 centered on the destination station can be set using a center value of the angles of tangent lines on both sides on the map 31 or intersection points with a circle of a specific distance centered on the destination station on the map 31. The same is applied to a case where there are two or more railroad tracks.

Figure 5:
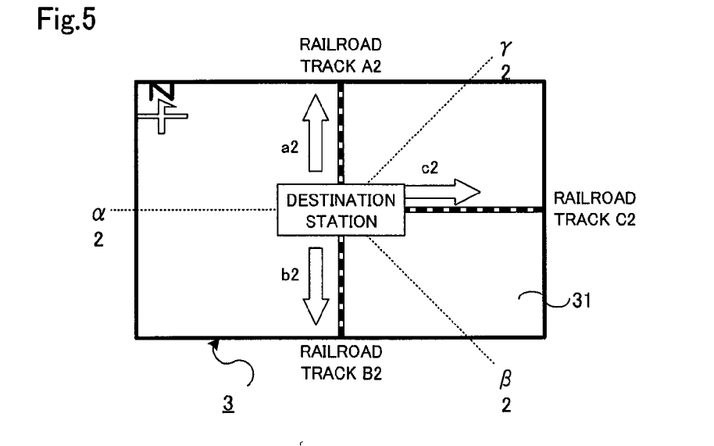
FIG. 5 is an explanatory drawing of detecting a flick scroll operation in an example of a station, to which a plurality of railroad tracks are connected, in the navigation device according to the embodiment of the present invention.

FIG. 5 shows an example of a case where the station set as the destination is a station where a railroad track A2 and a railroad track B2 pass and another railroad track C2 starts.

When touching a display screen and performing a flick in the direction of an arrow a2 along the railroad track, the adjacent station on the north side (an upper side) of the destination station is displayed as the candidate. In the same manner, when performing a flick in the direction of an arrow b2, the adjacent station on the south side (an lower side) of the destination station is displayed as the candidate. When performing a flick in the direction of an arrow c2, the adjacent station on the east side (a right side) of the destination station is displayed as the candidate. Here, whether or not the flick was performed along the railroad track is determined by whether or not the flick was performed from the destination station as a center at an angle within a predetermined area along each of the railroad track A2 (a railroad track extending from the destination station to the north), the railroad track B2 (a railroad track extending from the destination station to the south), and the railroad track C2 (a railroad track extending from the destination station to the east).

For example, centered on the destination station, a straight line α2 (180 degrees) that equally divides the angle made by the railroad track A2 (90 degrees) and the railroad track B2 (270 degrees), a straight line β2 (315 degrees) that equally divides the angle made by the railroad track B2 (270 degrees) and the railroad track C2 (0 degrees), and a straight line γ2 (45 degrees) that equally divides the angle made by the railroad track C2 (0 degrees) and the railroad track A2 (90 degrees) are set. Then, if the flick angle, that is, the angle of the line made with the start point and the end point of the flick is from 45 to 180 degrees, it is determined that the flick was performed along the railroad track A2; if the flick angle is from 180 to 315 degrees, it is determined that the flick was performed along the railroad track B2; and if the flick angle is from 315 to 45 degrees including 0 degrees, it is determined that the flick was performed along the railroad track C2.

Figure 6:
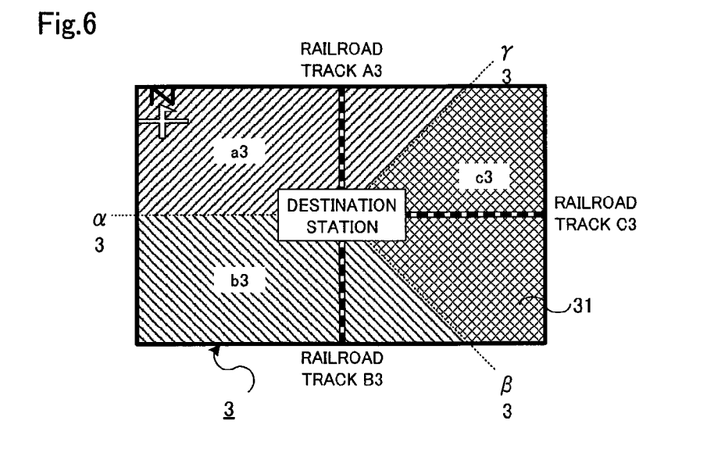
FIG. 6 is an explanatory drawing of detecting a touch scroll operation in an example of a station, to which a plurality of railroad tracks are connected, in the navigation device according to the embodiment of the present invention.

FIG. 6 is an example of a case of detecting the scroll direction based on touch operation by pressing the touch panel instead of the flick operation on the touch panel.

When placing a finger on a screen of the map 31 serving as the touch panel and touching an area a3 between straight lines γ3 and α3 that are radiated from the destination station, the adjacent station on the north side (the upper side) of the destination station is displayed as the candidate. In the same manner, when touching an area b3 between straight lines α3 and β3 that are radiated from the destination station, the adjacent station on the south side (the lower side) of the destination station is displayed as the candidate; and when touching an area c3 between straight lines β3 and γ3 that are radiated from the destination station, the adjacent station on the east side (the right side) of the destination station is displayed as the candidate. Here, whether or not the touch was performed along the railroad track is determined by whether or not the touch was performed from the destination station as a center at an angle within a predetermined area along each of a railroad track A3 (a railroad extending from the destination station to the north), a railroad track B3 (a railroad extending from the destination station to the south), and a railroad track C3 (a railroad extending from the destination station to the east).

For example, in the present embodiment, centered on the destination station, the straight line α3 (180 degrees) that equally divides the angle made by the railroad track A3 (90 degrees) and the railroad track B3 (270 degrees), the straight line β3 (315 degrees) that equally divides the angle made by the railroad track B3 (270 degrees) and the railroad track C3 (0 degrees), and the straight line γ3 (45 degrees) that equally divides the angle made by the railroad track C3 (0 degrees) and the railroad track A3 (90 degrees) are set. Then, if the touched area is an area a3 that is from 45 to 180 degrees, it is determined that the touch was performed along the railroad track A3; if the touched area is an area b3 that is from 180 to 315 degrees, it is determined that the touch was performed along the railroad track B3; and if the touched area is an area c3 that is from 315 to 45 degrees including 0 degrees, it is determined that the touch was performed along the railroad track C3.

In the example of FIG. 5, it is possible to vary the station to display as the candidate according to the speed of the scroll operation by the user. Normally, when the user performs the scroll operation, the scroll is executed to the station adjacent to the destination station and the adjacent station is displayed as the destination change candidate. However, if the user performs the scroll operation fast, the scroll is performed to the station where a rapid train or an express train stops next to the destination station. The determination of scroll operation speed is detected when the speed of the flick is equal to or more than a predetermined value in case of the scroll by flick, and when the pressure on a touched point is equal to or more than a predetermined value in case of the scroll by touch.

Figure 7:
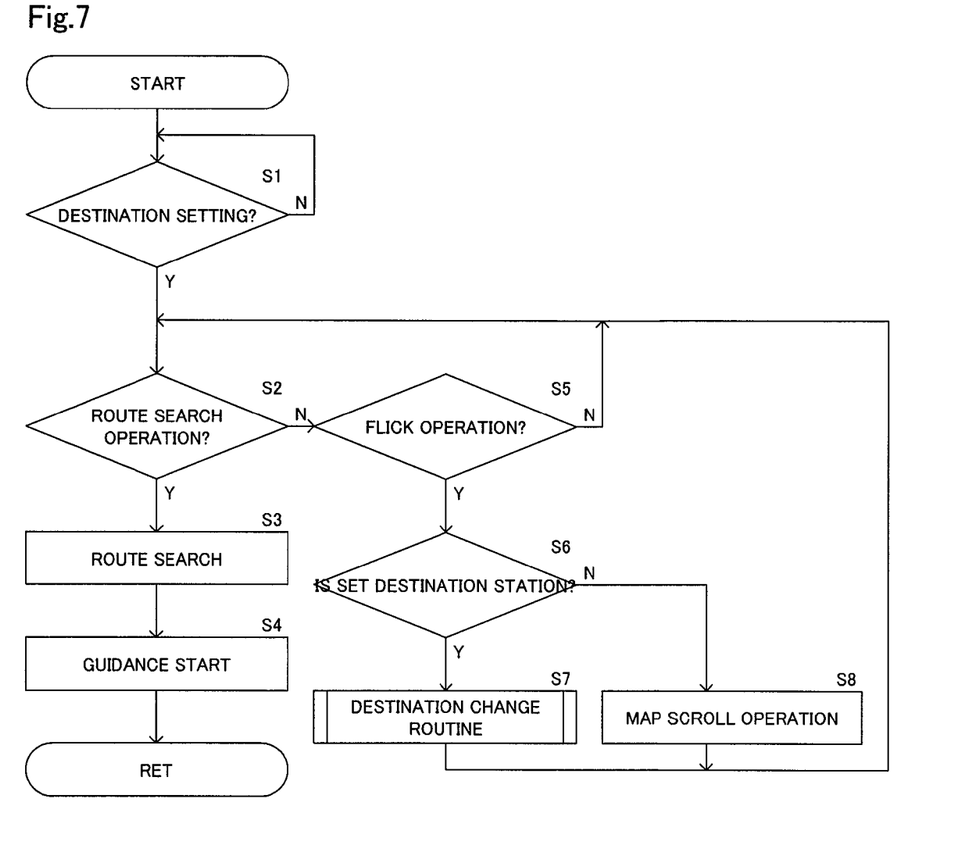
FIG. 7 is a flowchart of processing of a "destination setting routine" in the navigation device according to the embodiment of the present invention.

FIG. 7 is a flowchart of the operation of the navigation device. In this flowchart, a case is described as an example, in which the station of the train as the destination is set or changed by the scroll operation by flick. However, the same manner is applied to another scroll method such as the touch operation, a joystick operation, and the like, and also to a case where another type of destination such as the interchange has been set.

Under a condition where the map 31 is displayed on the display 3, when the destination is set at Step S1 and route search operation is performed for the set destination at Step S2, route search is performed at Step S3 and guidance according to the searched route starts at Step S4. This routine is a base function of the navigation.

When the flick operation is performed at Step S5 before the route search operation is performed at Step S2, the map 31 displayed on the display 3 is scrolled in a flick direction. In this scroll, the operation varies according to whether or not the set destination is a facility having the connection relation such as a station, an interchange, and the like. Specifically, it is determined at Step 6 whether or not the set destination is a station. If the set destination is a station, a change of the destination is performed by the operation of the user in a "destination change routine" at Step S7, and the procedure returns to Step S2. If the set destination is not a station, normal map scroll processing is performed according to the flick operation at Step S8, and the procedure returns to Step S2.

The "destination change routine" may be executed if the start point of the flick is the set destination in addition to Step S6. In this case, if the set destination is the station and the start point of the flick is the set destination station, the change of the destination is performed by the operation of the user in the "destination change routine" at Step S7, and the procedure returns to Step S2. If the start point of the flick is not the set destination station, the normal map scroll processing is performed at Step S8, and the procedure returns to Step S2.

Figure 8:
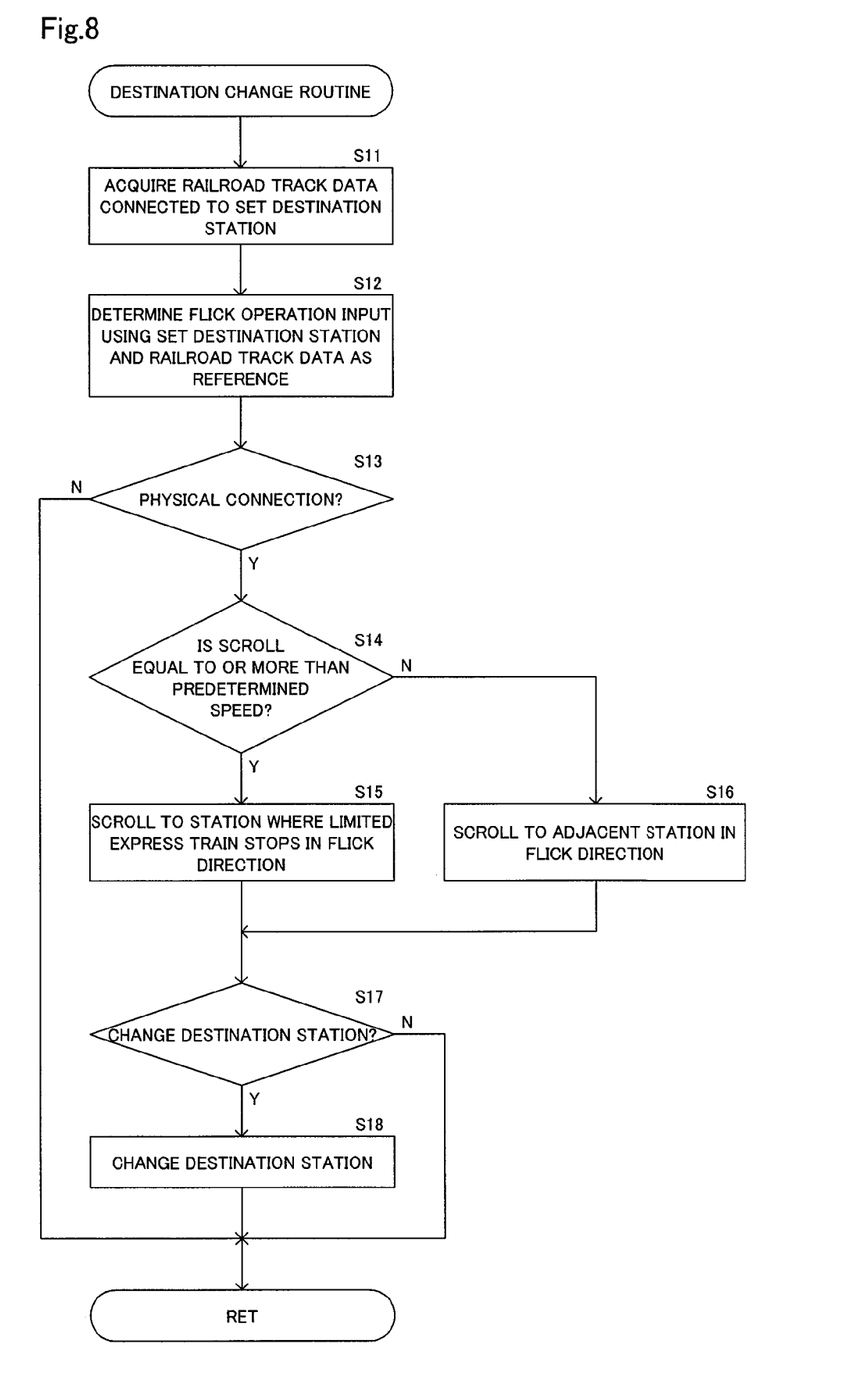
FIG. 8 is a flowchart of processing of a "destination change routine" in the navigation device according to the embodiment of the present invention.

Next, the "destination change routine" at Step S7 is described in detail with reference to FIG. 8. When the "destination change routine" is executed at Step S7 of FIG. 7, data of the railroad track connected to the set destination station is acquired at Step S11 of FIG. 8 and an angle or an area to determine the scroll direction is identified based on the set destination station and the railroad track data at Step S12. Specifically, with use of methods from FIGS. 4 to 6, at least one of the angle, the area of the flick operation, and the speed of the flick operation to determine the scroll direction is identified.

Next, it is determined at Step S13 whether or not there is a physical connection. If there is no physical connection relation, the processing of this routine does not apply and the routine is skipped. If the destination is connected through a railroad track (or, a highway, a line, or the like), there is a physical connection. Therefore, it is determined whether or not the flick operation was performed at a predetermined speed or faster. If it is determined the flick operation was performed at the predetermined speed or faster, the station in the flick direction where a limited express train stops is selected as the destination change candidate at Step S15 and the map 31 is scrolled to the destination candidate station. If the flick is slower than the predetermined speed at Step S14, the adjacent station in the flick direction is selected as the destination change candidate and the map is scrolled to the destination candidate station at Step S16.

After the map was scrolled to the destination candidate station at Step S15 or Step S16, the user sets the displayed destination candidate station as a new destination station through the touch operation or the like if necessary at Step S17 and Step S18. That is, when the user changes the destination station at Step S17, the station selected at Step S15 or Step S16 is set as the destination station in place of the previously-set destination station at Step S18.

Then, regardless of presence or absence of a destination change at Step S17, the "destination change routine" terminates. The procedure returns to Step S2 of FIG. 7 and the processing of the navigation continues.

Further, a specific example of the navigation device according to the present embodiment is described.

Figure 9:
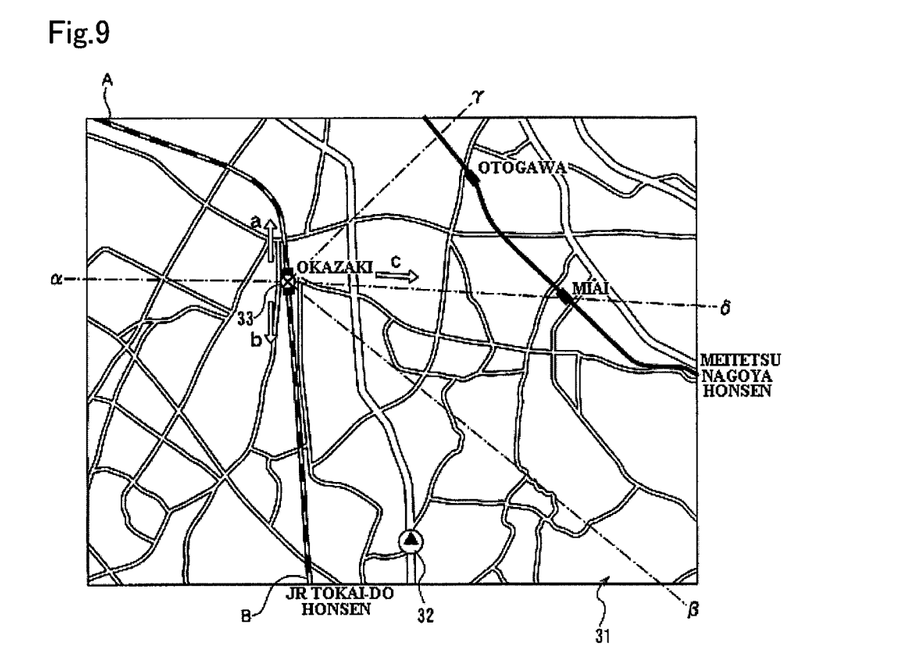
FIG. 9 is an explanatory drawing of a screen in an example of driving with the navigation device according to the embodiment of the present invention installed in a vehicle and selecting a station that is adjacent to Okazaki station of a railroad line.

FIG. 9 is an explanatory drawing of an example of selecting Nishi-okazaki station or Kota station after setting Okazaki station of the railroad line as the destination on the navigation device according to the present embodiment installed in the vehicle.

First, as shown in FIG. 9, it is assumed that the current position of the vehicle or the like is located at the position of a mark 32 and the destination has been set to Okazaki station with the specific icon 33.

When performing a flick along the railroad track in the direction of an arrow a, the procedure goes to the "destination change routine" at Step S7 via Step S5 and Step S6 because the set destination is a station. Next, it is determined that the scroll direction is an upper direction of the screen at Step S11 and Step S12, the physical connection relation is confirmed with the information in the facility information DB 84 at Step S13, and it is determined whether or not the flick is equal to or more than the predetermined speed at Step S14. If the flick is slow and the speed is less than the predetermined speed, Nishi-okazaki station that is the adjacent station in the flick direction is selected as the destination change candidate at Step S16. If the flick is fast and the speed is equal to or more than the predetermined speed, Anjo station that is the station in the flick direction where the limited express train stops is selected as the destination change candidate at Step S15.

In the same manner, when performing the flick along the railroad track in the direction of an arrow b, it is determined that the scroll direction is a lower direction of the screen at Step S11 and Step S12, the physical connection relation is confirmed at Step S13, and it is determined whether or not the flick is equal to or more than the predetermined speed at Step S14. If the flick is slow and the speed is less than the predetermined speed, Kota station (not shown) that is the adjacent station in the flick direction is selected as the destination change candidate at Step S16. If the flick is fast and the speed is equal to or more than the predetermined speed, Gamagori station (not shown) that is the station in the flick direction where the limited express train stops is selected as the destination change candidate at Step S15. The predetermined speed of the flick operation may be set to a plurality of steps, and the adjacent station, the station where the express train stops, or the station where the limited express train stops may be selected in the order of the slowest speed of the flick first. That is, the station to be selected may vary according to train type numbers (for example, a train type 1 for stations where only a local train stops, a train type 2 for stations where the express train stops, and a train type 3 for stations where the limited express train stops).

If the set destination is not a station, when performing a flick in the direction of an arrow c, it is determined at Step S6 after Step S5 that the set destination is not a station, and it is determined the direction operated on the operating unit is the scroll direction and the map 31 is scrolled in the scroll direction at Step S8. That is, if the destination does not have the connection relation, the map 31 is scrolled in the direction operated on the operating unit.

As described above, the navigation device according to the aforementioned embodiment that searches for a route to the destination or provides guidance on the information of the destination, includes: the facility information DB 84 and the association searching unit 93 as recording units that record the facilities being target for the destination and the connection relation between such facilities; the destination setting unit 91 having Step S1 that sets the destination from the facilities recorded in the facility information DB 84; and a displaying unit configured with the display 3 that displays the map to the destination to guide; the scroll direction detecting unit 92 that detects the scroll direction of the map based on the finger operation by the drag operation or the flick operation on the operating unit; and the display controlling unit 94 that scrolls the map 31 in the detected scroll direction. In the navigation device, if the destination is a facility not having the connection relation, the scroll direction detecting unit 92 detects the direction instructed for scroll as the scroll direction and the display controlling unit 94 performs the scroll of the map 31 in the scroll direction as indicated at Step S8; if the destination is a facility having the connection relation, the scroll direction detecting unit 92 detects the scroll direction based on the connection relation of the destination and the direction instructed for scroll and the display controlling unit 94 performs the scroll of the map 31 in the scroll direction to a position of a facility connected to the destination at Step S7.

The facility information recording unit according the aforementioned embodiment corresponds to the facility information DB 84 and the association searching unit 93 as recording units that record the facilities being target for the destination and the connection relation between such facilities. The destination setting unit 91 includes Step S1 that sets the destination from the facilities recorded in the facility information DB 84 serving as the facility information recording unit. The displaying unit is configured with the display 3 that displays the map 31 to the destination to guide. The scroll direction detecting unit 92 detects the scroll direction of the map 31. The display controlling unit 94 scrolls the map 31 in the scroll direction detected by the scroll direction detecting unit 92. In addition, the operating unit that is used for the scroll operation of the map 31 applies the scroll input of the finger operation by the drag operation and the flick operation on the touch panel.

Further, when the destination is a facility not having the connection relation and the direction instructed for scroll is detected as the scroll direction, the display controlling unit 94 performs the scroll of the map 31 in the scroll direction. When the destination is a facility having the connection relation and the scroll direction is detected based on the connection relation of the destination and the direction instructed for scroll, the display controlling unit 94 performs the scroll of the map 31 in the scroll direction to a position of a facility connected to the destination.

Consequently, after the destination has been set, if a place other than the destination becomes necessary to be selected, an associated place that belongs to an attribute of the originally-set destination is searched only by the scroll instruction from the originally-set destination. Therefore, without a re-input, a candidate place is displayed and it becomes easy to change to a destination with which a closed road due to road construction or the like, traffic congestion, and the like are avoided. Thus, without operating the navigation device by re-inputting, the candidate place is selected using the attribute of the destination that was originally set as the destination, by which a troublesome operation of re-inputting the destination for a setting change is eliminated and re-setting becomes easy. Even after the change was performed, the operator can perform another change without feeling bothered. In addition, a very short time is required for the operation of the operator by a finger or a pen, thereby the time for destination change can be reduced.

The scroll direction detecting unit 92 according to the aforementioned embodiment, if the facility is a facility having the connection relation and the start point of the scroll instruction of the scroll is on the facility displayed on the touch panel, detects the scroll direction based on the connection relation of the facility recorded in the facility information DB 84 and the direction instructed for scroll. Consequently, the operator can visually confirm the facility on the map 31 and instruct the scroll through the finger operation by the drag operation or the flick operation on the touch panel, which makes the device easy to operate for anyone.

The display controlling unit 94 according to the aforementioned embodiment displays the facility connected to the facility as the destination so as to be distinguishable as the destination change candidate.

Consequently, as the facility connected to the facility as the destination is distinguishably displayed as the destination change candidate, it is possible to confirm the direction to scroll, which can prevent the operator from scrolling in a wrong direction.

The facility having the connection relation according to the aforementioned embodiment is a station connected through a railroad track or an interchange of a highway or both.

Consequently, a selection can be performed as if operating on the map. Such operation method ergonomically matches the feeling of the human-being, and is easily learned with less mistakes.

The display controlling unit 94 according to the aforementioned embodiment, if the speed of the scroll instruction given on the operating unit is equal to or more than the predetermined speed, performs the scroll to the station, where the local train, the limited express train, the express train, or the rapid train stops, according to the scroll speed.

Consequently, it is possible to add the information of the scroll speed, which enables the operator to select a desired station.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A navigation device configured to search for a route to a destination or provide guidance on a facility related to the destination, the navigation device comprising:
    a facility information storing unit configured to store facilities and connection relations among the facilities;
    a destination setting unit configured to set a first facility among the facilities stored in the facility information storing unit as the destination;
    a displaying unit configured to display a map of a vicinity of the set destination;
    an operating unit for receiving a scroll operation on the map by a user;
    a scroll direction detecting unit configured to detect a scroll direction of the map based on the scroll operation received by the operating unit; and
    a display controlling unit configured to scroll the map in the scroll direction detected by the scroll direction detecting unit, wherein
    when the first facility has no stored connection relation with the other facilities,
        the scroll direction detecting unit is configured to detect a direction of the scroll operation received by the operating unit as the scroll direction, and
        the display controlling unit is configured to scroll the map in the scroll direction,
    when the first facility set as the destination by the destination setting unit has a stored connection relation with a second facility among the other facilities,
        the scroll direction detecting unit is configured to detect the scroll direction based on both (i) the stored connection relation of the first and second facilities and (ii) the direction of the scroll operation received by the operating unit, and
        the display controlling unit is configured to scroll the map to a position of the second facility in the scroll direction and display the second facility as a destination candidate in a distinguishable manner,
    the displaying unit is configured to function as the operating unit,
    the first facility is a first station on a railroad track,
    the second facility is a second station connected to the first station through the same railroad track, and
    the display controlling unit is configured to, if a speed of the scroll operation on the operating unit is equal to or more than a predetermined speed, scroll the map to a station where an express train stops next in the scroll direction.

2. The navigation device according to claim 1, wherein
    the display controlling unit is configured to display the second facility as the destination candidate with a specific icon, and
    upon the user selecting the specific icon, the destination setting unit is configured to set the second facility as a new destination.

* * * * *